United States Patent [19]

Gahang

[11] Patent Number: 5,642,406
[45] Date of Patent: Jun. 24, 1997

[54] TONE RECOGNITION METHOD USING TONE LEARNING OPERATION IN AN AUTOMATIC ANSWERING SYSTEM

[75] Inventor: Goo-Soo Gahang, Seoul, Rep. of Korea

[73] Assignee: SamSung Electronics Co., Ltd., Suwon, Rep. of Korea

[21] Appl. No.: 595,552

[22] Filed: Feb. 1, 1996

[30] Foreign Application Priority Data

Jul. 6, 1995 [KR] Rep. of Korea ............... 19799/1995

[51] Int. Cl.[6] .................... H04M 1/24; H04M 1/65
[52] U.S. Cl. .................. 379/67; 379/81; 379/257; 379/386
[58] Field of Search ............... 379/31, 23, 27, 379/6, 11, 67, 88, 89, 81, 386, 257

[56] References Cited

U.S. PATENT DOCUMENTS

| | | |
|---|---|---|
| 4,694,482 | 9/1987 | Reesor et al. ............ 379/27 |
| 4,935,958 | 6/1990 | Morganstein et al. ............ 379/372 |
| 5,406,621 | 4/1995 | Binal ............ 379/386 |
| 5,416,836 | 5/1995 | Marinelli et al. ............ 379/377 |
| 5,463,670 | 10/1995 | Chiang et al. ............ 379/27 |
| 5,479,501 | 12/1995 | Lai ............ 379/377 |

*Primary Examiner*—Thomas W. Brown
*Attorney, Agent, or Firm*—Robert E. Bushnell, Esq.

[57] ABSTRACT

The present invention provides an automatic answering system that, upon being provided with operating power, uses a tone pattern learning operation to identify an applicable busy tone pattern. After the applicable busy tone pattern is identified, when a calling party records a message on a recording medium of the system, the system performs a detection mode subroutine corresponding to the identified busy tone pattern and detects the busy tone in a rapid and accurate manner. As a result, unnecessary use of the recording medium is eliminated.

37 Claims, 10 Drawing Sheets

TONE RECOGNITION METHOD USING TONE LEARNING OPERATION IN AN AUTOMATIC ANSWERING SYSTEM

CROSS-REFERENCE TO RELATED APPLICATIONS

This application makes reference to, incorporates the same herein, and claims all benefits accruing under 35 U.S.C. §119 from an application for *Tone Recognition Method Using Tone Learning Operation In An Automatic Answering System* earlier filed in the Korean Industrial Property Office on 6 Jul. 1995 and there assigned Ser. No. 19799/1995.

BACKGROUND OF THE INVENTION

The present invention relates to a method and system for performing an automatic answering function, and more particularly, to a method and system for rapidly recognizing various busy tone patterns used in different countries.

Conventionally, an automatic answering function is performed when an incoming call from a calling party is received by a telephone answering system during a user's absence. In response to the incoming call, a pre-recorded greeting message from the user is transmitted to the calling party under the control of the telephone answering system. A message received from the calling party is then recorded, and upon the request of the user, the message received from the calling party is reproduced for the user. Such an automatic answering function has facilitated user convenience by being used in terminals of wired and wireless telephone sets and facsimile machines.

In implementing the automatic answering function, it is important how fast the automatic answering system detects when the calling party has terminated the call by hanging up the handset of his telephone. After the system detects that the calling party has terminated the call, the operation of recording signals on a recording medium of the system is stopped.

Once the calling party terminates the call by hanging up the handset of his telephone, most exchange systems transmit a busy tone to the answering system. Therefore, the answering system recognizes that the calling party has terminated the call by detecting the busy tone. Typically, the answering system continues to record signals onto the recording medium until the busy tone is detected. According to this conventional method, the recording operation is stopped about 12 seconds after the calling party's message has been completed. In other words, the time period necessary for the automatic answering system to detect the busy tone is about 12 seconds. In this situation, there is a problem in that the busy tone, or silence, is unnecessarily recorded on the recording medium of the answering system.

To solve this problem, the unnecessary recorded portion, for example, about 6 seconds before the recording is stopped, can be erased. This solution, however, has a defect in that it requires the user to inconveniently erase the unnecessary portion of the recorded message which is usually very difficult to accurately locate.

Generally, busy tones are classified according to pulse width pattern. Different countries and exchanges use busy tones having different pulse width patterns. Therefore, the automatic answering system often requires a long period of time (i.e., about 12 seconds) to detect the busy tone used by a particular exchange or country since the system possesses no information regarding the pulse width pattern of the busy tone. As a result, the automatic answering system must record unnecessary information on the recording medium, thereby making it difficult to efficiently use the recording medium. However, if the automatic answering system is able to recognize the pattern of the busy tone used by the particular exchange or country, the busy tone can be detected in about 6 seconds.

From the discussion above, it can be appreciated that a preferable solution for eliminating unnecessary recording is to accurately detect the busy tone within a minimum period of time.

One prior art reference that seeks to detect a busy tone is disclosed in U.S. Pat. No. 4,694,482 entitled *Digital Tone Detector* issued to Reesor et al. In Reesor et al. '482, a digital tone detector generates one or more reference tones having user definable frequencies, and performs single frequency discrete Fourier transforms on one or more signals received from the telephone line at the defined frequencies to provide an indication of whether or not one or more predetermined busy tones frequencies are detected in the received signals. While conventional art, such as Reesor et al. '482, possesses merit in its own right, I believe that an improved method for accurately detecting a busy tone within minimum period of time can be contemplated.

SUMMARY OF THE INVENTION

Accordingly, it is an object of the present invention to provide an improved method for detecting a busy tone in a system having an automatic answering function.

It is another object to provide a method and system capable of accurately detecting a busy tone within a minimum period of time.

It is still another object to provide a method capable of completing recording of a calling party's message within a minimum period of time in an automatic answering system.

It is yet another object to provide a method capable of efficiency using a recording medium in an automatic answering system by eliminating unnecessary recording on the recording medium.

It is still yet another object to provide a method and system capable of detecting a busy tone within a minimum period of time regardless of the pulse width pattern of the busy tone.

It is a further object to provide a method and system capable of detecting standardized busy tones used in various countries within a minimum period of time.

It is still a further object to provide a method and system capable of accurately detecting a busy tone within a minimum period of time by using a busy tone pattern learning operation that recognizes an applicable busy tone pattern upon applying operating power to the system.

It is yet a further object to provide a software method capable of detecting a busy tone within a minimum period of time.

To achieve these and other objects, the present invention provides an automatic answering system that, upon being provided with operating power, uses a tone pattern learning operation to identify an applicable busy tone pattern. After the applicable busy tone pattern is identified, when a calling party records a message on a recording medium of the system, the system performs a detection mode subroutine corresponding to the identified busy tone pattern and detects the busy tone in a rapid and accurate manner. As a result, unnecessary use of the recording medium is eliminated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
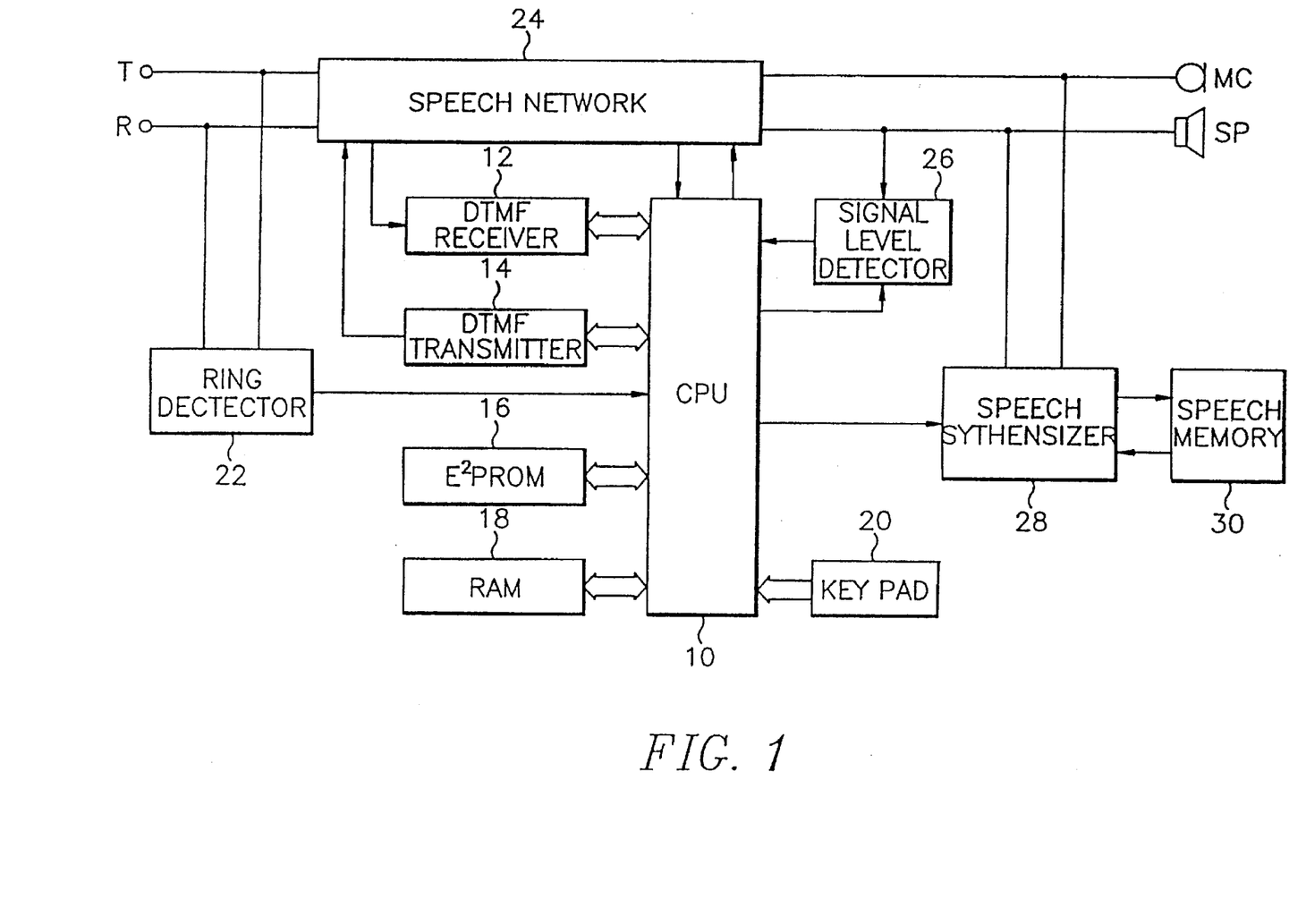
FIG. 1 is a block diagram illustrating a general configuration of an automatic telephone answering system constructed according to the principles of the present invention.

Turning now to the drawings and referring to FIG. 1, a block diagram illustrating a general configuration of an automatic telephone answering system constructed according to the principles of the present invention is shown. In FIG. 1, a central processing unit (CPU) 10 controls operation of each system component in accordance with key inputs and various signals. A dual tone multi-frequency (DTMF) receiver 12 receives a dual tone multi-frequency (DTMF) signal corresponding to a telephone number input through tip and ring terminals T and R and a speech network 24, and provides output of the received dual tone multi-frequency (DTMF) signal to central processing unit (CPU) 10. Dual tone multi-frequency (DTMF) transmitter 14 transmits the dual tone multi-frequency (DTMF) signal corresponding to the telephone number era calling party under the control of central processing unit (CPU) 10. An electrically erasable and programmable read only memory ($E^2$PROM) 16 is accessed by central processing unit (CPU) 10 and stores and outputs data related to program performance. A random access memory (RAM) 18 stores predetermined data under the control of central processing unit (CPU) 10. A key pad 20 has telephone number keys and a number of function keys, and provides key input signals to central processing unit (CPU) 10 according to key operation. A ring detector 22 is connected to tip and ring terminals T and R era telephone line to detect a ring signal and inform central processing unit (CPU) 10 of the detected ring signal. Speech network 24 is connected to tip and ring terminals T and R and forms a speech path under the control of central processing unit (CPU) 10. A signal level detector 26 detects a voltage level of signals provided from speech network 24 and outputs a logic signal representative of a detected voltage level to central processing unit (CPU) 10. Signal level detector 26 may be embodied by a bandpass filter which filters the input signal, a rectifying and smoothing circuit which rectifies and smooths the output of the bandpass filter, and a comparison circuit which compares the signal output from the rectifying and smoothing circuit with a predetermined reference voltage and provides a result of the comparison as a digital signal having a given pulse pattern.

A speech memory 30 stores speech data and outputs the stored speech data under the control of a speech synthesizer 28 controlled by central processing unit (CPU) 10. The speech data may include an outgoing voice message input by a user through a microphone (MC), and an incoming voice message received from a calling party and output through a speaker (SP). Speech synthesizer 28 converts a speech signal provided from speech network 24 or microphone (MC) into a digital signal and encodes the digital signal. Speech synthesizer 28 then stores the encoded signal as speech data in speech memory 30 and synthesizes the stored speech data to generate a speech signal. Speaker (SP) and microphone (MC) may be configured as part of a transmitting and receiving portion of the telephone system.

Figure 2A:
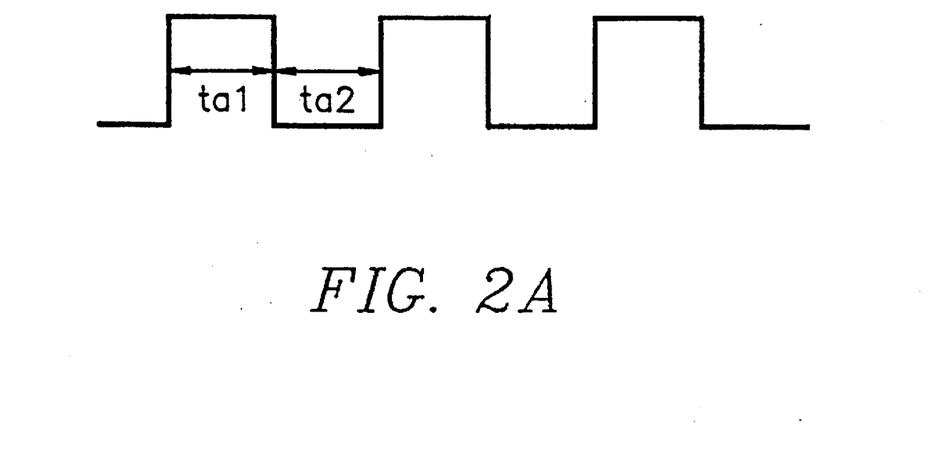
FIGS. 2A to 2C are waveforms illustrating various types of busy tone patterns.
Figure 2B:
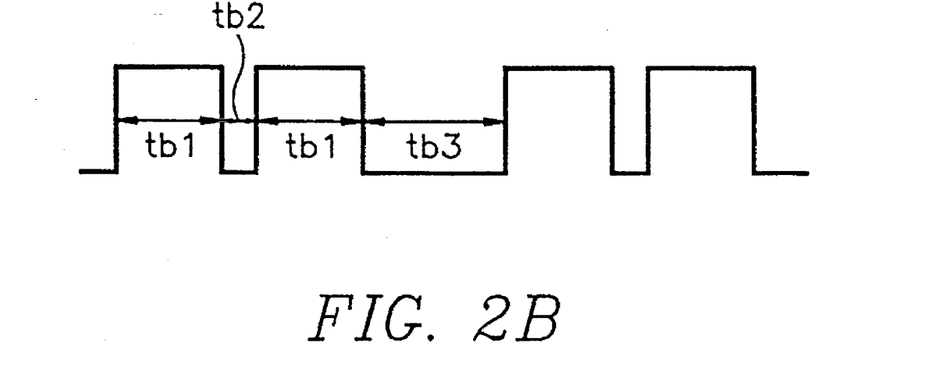
Figure 2C:
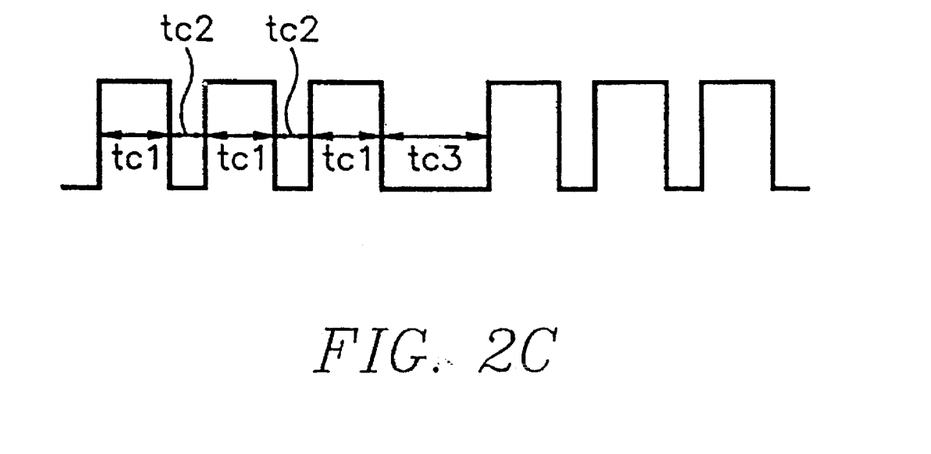

FIGS. 2A to 2C show three different busy tone patterns used in various countries throughout the world. The busy tone patterns shown in FIGS. 2A to 2C are recognized by the telephone answering system of the present invention through a tone pattern learning operation represented in FIG. 3. That is, the automatic telephone answering system of FIG. 1 recognizes whether the busy tone of a given country (or adjacent office exchange) corresponds to any one of the patterns shown in FIGS. 2A to 2C through the tone pattern learning operation depicted in FIG. 3. Recognition is performed by detecting the repetitive sequences of the busy tone (i.e., repetitive on/off states of time intervals ta1 and ta2, tb1, tb2 and tb3, and tc1, tc2 and tc3).

Figure 3:
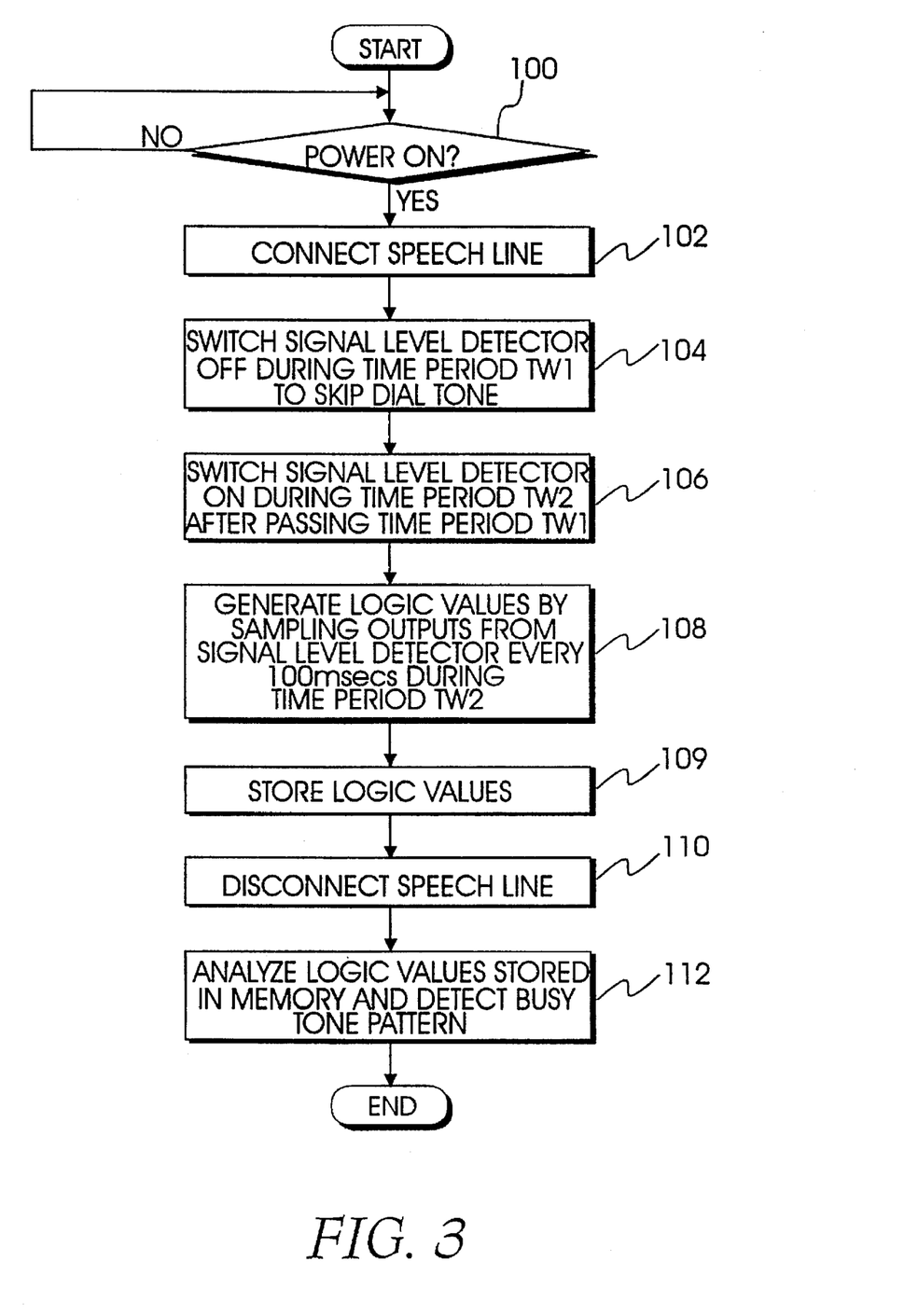
FIG. 3 is a flow chart illustrating control processes for a tone pattern learning operation according to the present invention.

The tone pattern learning operation of FIG. 3 is performed based upon the fact that if the speech line is connected to the interior of the automatic telephone answering system and no telephone number is dialed, the exchange transmits a dial tone to the automatic telephone answering system for about 10 seconds, and then transmits the busy tone.

Referring to FIG. 3, when the automatic telephone answering system is provided with operating power by a user, central processing unit (CPU) 10 of FIG. 1 detects the power-on state at step 100, and controls speech network 24 to connect a speech line at step 102. Accordingly, the exchange provides the dial tone to central processing unit (CPU) 10 through speech network 24 and signal level detector 26. In step 104, central processing unit (CPU) 10 switches signal level detector 26 off during a first time period Tw1 (approximately 15 seconds) in order to skip the dial tone. When the busy tone is generated after the first time period Tw1, central processing unit (CPU) 10 switches signal level detector 26 on during a second time period Tw2 (approximately 20 seconds) to detect a signal level of the busy tone. Under the control of central processing unit (CPU) 10, signal level detector 26 compares the busy tone provided from speech network 24 with a predetermined reference level $T_{LEV}$ and detects the signal level of the busy tone. Signals having logic states (i.e., on/off states often referred to as make or break states) corresponding to the detected signal levels are output to central processing unit (CPU) 10. The predetermined reference level $T_{LEV}$ is preferably −43 dBm or −48 dBm.

In step 108, central processing unit (CPU) 10 samples the logic signals output from signal level detector 26 every 100 milliseconds during the second time period Tw2. In correspondence with the sampling operation, a logic value of "1" or "0" is generated. Then, in step 109, central processing unit (CPU) 10 sequentially stores the logic values generated in step 108. The number of logic values stored in random access memory (RAM) 18 is 200 (i.e., 20 secs/100 msecs).

In step 110, central processing unit (CPU) 10 controls speech network 24 to disconnect the speech line. In step 112, central processing unit (CPU) 10 analyzes the logic values stored in random access memory (RAM) 18, detects the tone pattern, and determines whether the busy tone used in the corresponding country (or in the adjacent exchange) is the same as any of the busy tone patterns of FIGS. 2A to 2C. The tone pattern learning operation is then terminated.

After the tone pattern learning operation of FIG. 3 is completed, the automatic telephone answering system of FIG. 1 can detect the busy tone for the applicable country or exchange.

Figure 4:
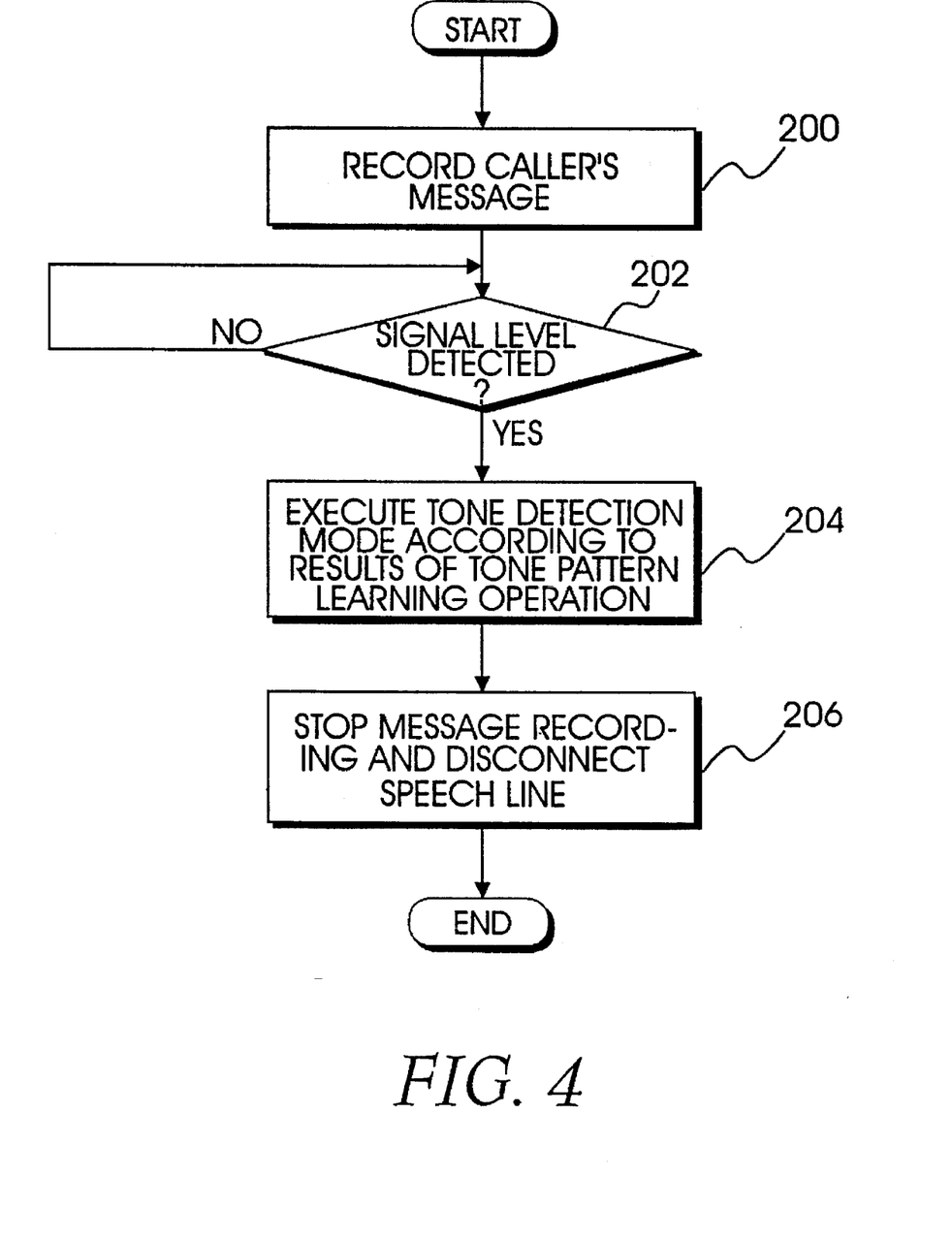
FIG. 4 is a flow chart illustrating control processes for busy tone detection performed on the basis of the tone pattern learning operation.

FIG. 4 is a flow chart illustrating control processes of detecting the busy tone after performing the tone pattern learning operation of FIG. 3. When an incoming call is received, the automatic telephone answering system of FIG. 1 forms a speech path and transmits a pre-recorded greeting message to the calling party. In step 200, the calling party's message is recorded.

Figure 6:
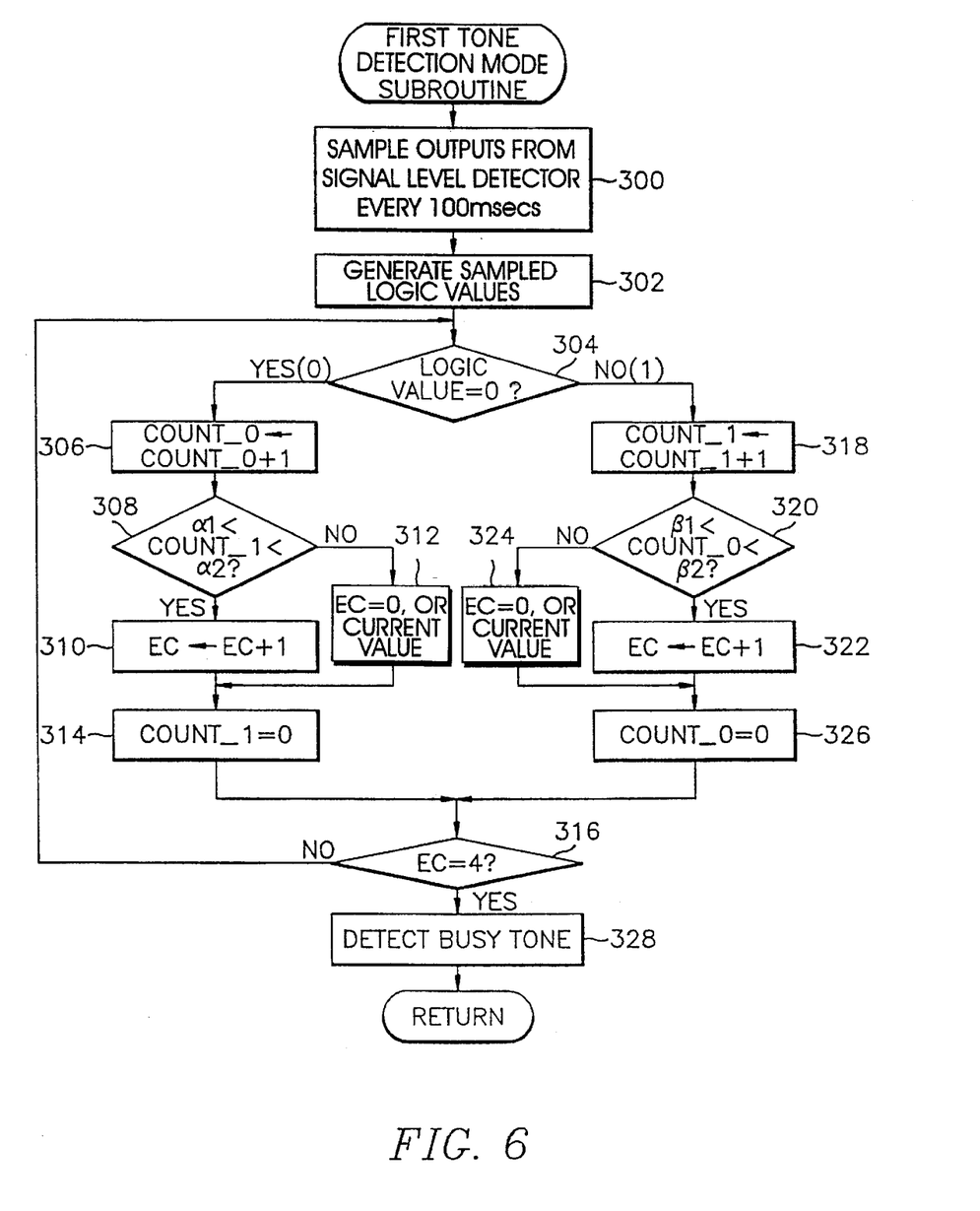
FIG. 6 is a flow chart illustrating subroutine control processes of a first tone detection mode used to detect the busy tone waveforms in FIGS. 5A and 5B.
Figure 8:
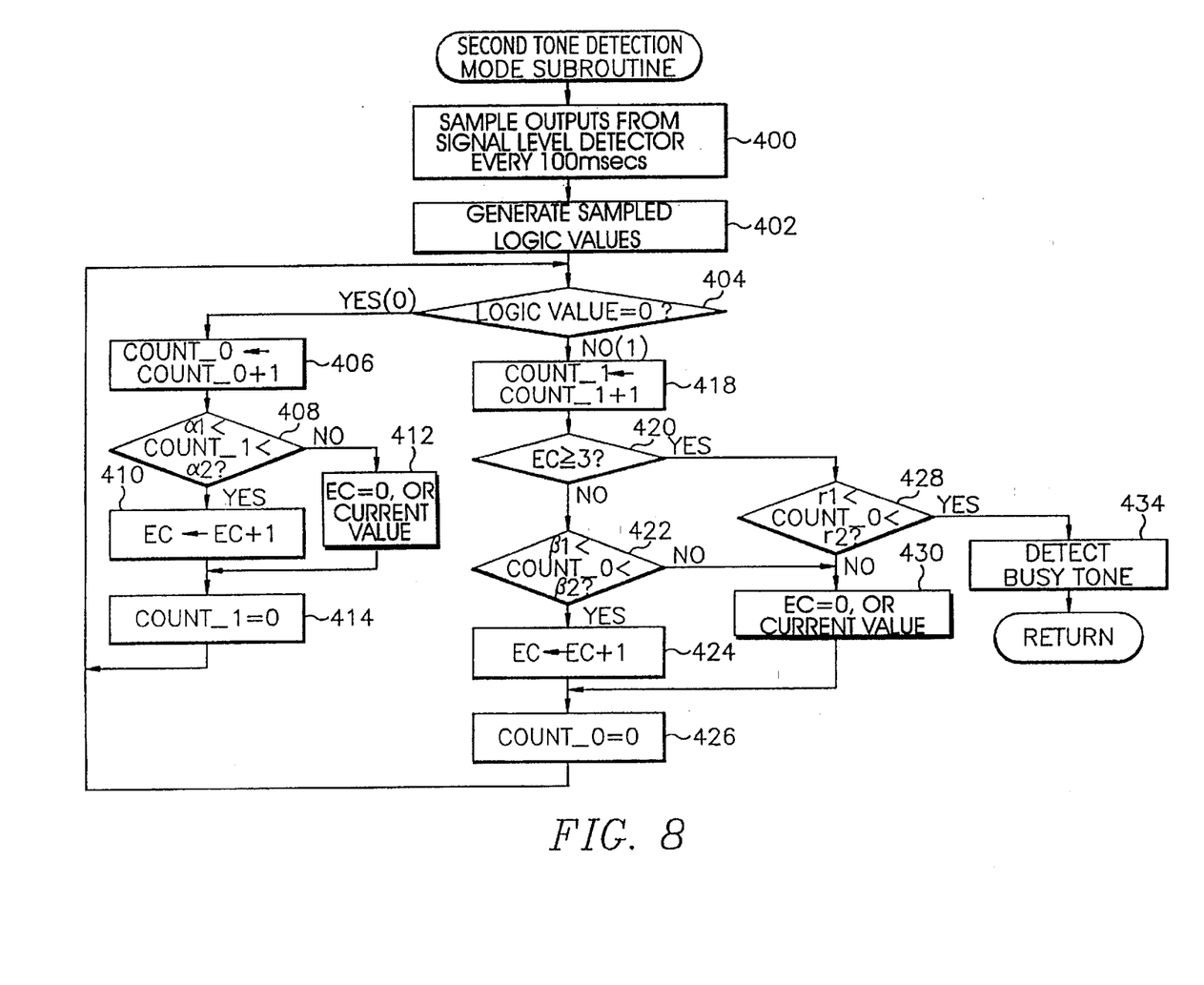
FIG. 8 is a flow chart illustrating subroutine control processes of a second tone detection mode used to detect the busy tone waveforms in FIGS. 7A and 7B.
Figure 10:
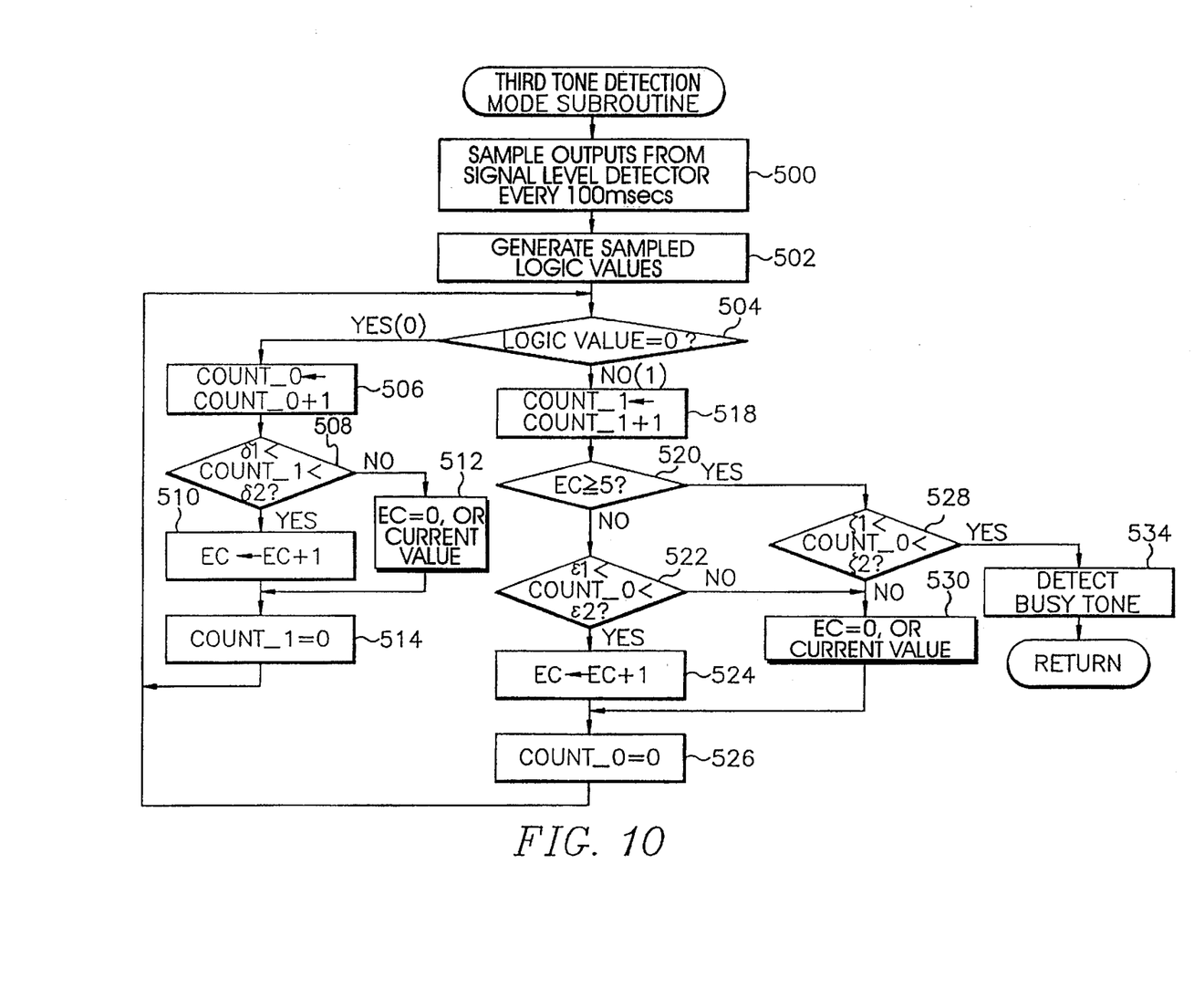
FIG. 10 is a flow chart illustrating subroutine control processes of a third tone detection mode used to detect the busy tone waveforms in FIGS. 9A and 9B.

In step 202, central processing unit (CPU) 10 determines whether a given signal level has been detected by signal level detector 26. When the given signal level has been detected, central processing unit (CPU) 10 proceeds to step 204 to perform subroutine processes corresponding to either the first, second or third tone detection modes in accordance with the result of the tone pattern learning operation of FIG. 3. The subroutine processes of the first, second and third tone detection modes are shown in FIGS. 6, 8 and 10, respectively. According to the present invention, the busy tone pattern is detected within a minimum time period by the subroutine processes of the first, second and third tone detection modes. When the busy tone has been detected, central processing unit (CPU) 10 stops recording and disconnects the speech line in step 206. That is, central processing unit (CPU) 10 controls speech synthesizer 28 to stop recording the incoming message, and also controls speech network 24 to disconnect the speech line.

The control operations of the subroutines of the first, second and third tone detection modes performed by central processing unit (CPU) 10 in step 204 of FIG. 4 will hereinafter be described in detail.

The first tone detection mode subroutine operation

Figure 5A:
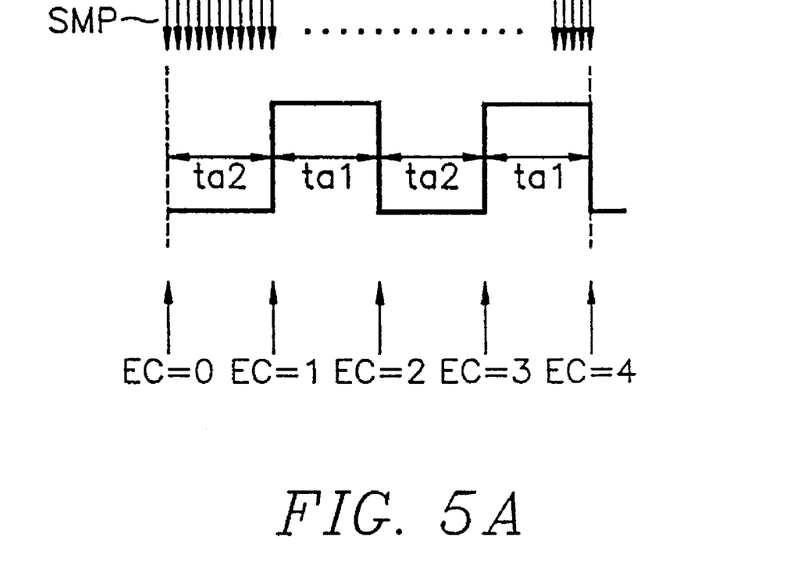
FIGS. 5A and 5B are waveforms illustrating the busy tone patterns detectable from the busy tone waveform of FIG. 2A.
Figure 5B:
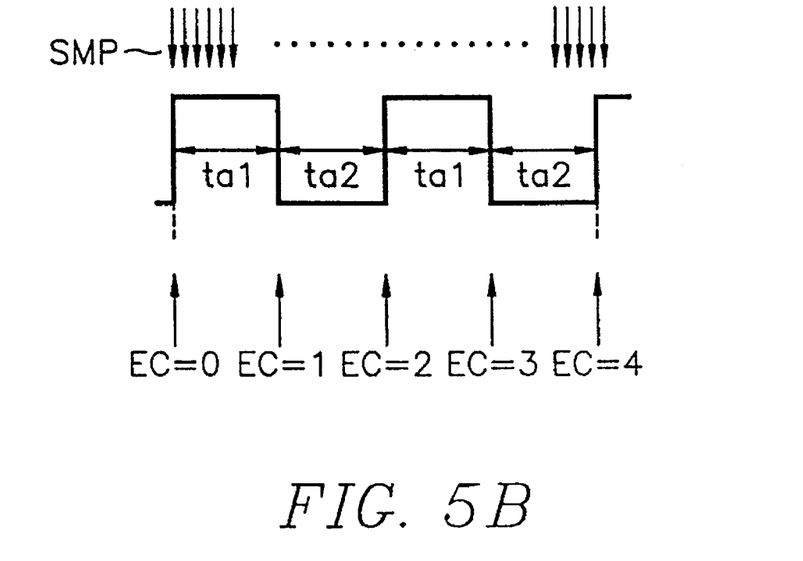

An explanation of the operation of the first tone detection mode subroutine will now be provided with reference to FIGS. 5A, 5B and 6.

FIGS. 5A and 5B are waveforms illustrating the busy tone patterns detectable from the busy tone waveform of FIG. 2A. As noted from the waveform shown in FIG. 2A, the time intervals ta1 and ta2 respectively indicative of on and off states are equal in duration. FIG. 5A shows the case where the detected waveform of FIG. 2A is initially in an off state. On the other hand, FIG. 5B shows the case where the detected waveform of FIG. 2A is initially in an on state. A reference symbol "SMP" designated in FIGS. 5A and 5B represents a sampling period of 100 msec according to which signal level detector 26 samples the busy tone.

A brief description of the steps shown in FIG. 6 will be given before a detailed explanation of FIG. 6 is provided. Central processing unit (CPU) 10 determines that the busy tone input through signal level detector 26 is in the on state, or otherwise in the off state. When central processing unit (CPU) 10 initially determines that the busy tone is in the off state, a determination is made as to whether a value exhibited by a counter COUNT_1, for counting occurrences of the logic state indicating that the busy tone is in the on state, is within an effective count range. That is, central processing unit (CPU) 10 determines whether $\alpha 1 < COUNT\_1 < \alpha 2$. During this time, central processing unit (CPU) 10 increments an edge counter EC based on whether the counted value is within the effective count range. On the other hand, if central processing unit (CPU) 10 initially determines that the busy tone is in the on state, a determination is made as to whether a value exhibited by a counter COUNT_0, for counting occurrences of the logic state indicating that the busy tone is in the off state, is within an effective count range. That is, central processing unit (CPU) 10 determines whether $\beta 1 < COUNT\_0 < \beta 2$. During this time, central processing unit (CPU) 10 increments the edge counter EC based on whether the counted value is within the effective count range. Central processing unit (CPU) 10 repetitively performs the above-described operations in accordance with on/off states of the busy tone, and when the edge counter EC equals a predetermined final count value, the busy tone is recognized based on the tone pattern learning operation of FIG. 3.

A busy tone detecting operation based on the first tone detection mode will now be explained with reference to FIG. 6.

In step 300, central processing unit (CPU) 10 reads the logic values of the signal output from signal level detector 26 and samples the read logic values every 100 msec. In step 302, central processing unit (CPU) 10 generates the sampled logic values of "0" or "1".

In step 304, central processing unit (CPU) 10 determines whether a first logic value received in sequential order is a "0" or "1". When the logic value is "0" (i.e., as shown by the waveform of FIG. 5A), central processing unit (CPU) 10 increases the count value of counter COUNT_0 by one in step 306. However, when the logic value is "1" (i.e., as shown by the waveform of FIG. 5B), central processing unit (CPU) 10 increases the count value of counter COUNT_1 by one in step 318.

Assuming that the first received logic value is "0", as shown in FIG. 5A, central processing unit (CPU) 10 increases the count value of counter COUNT_0 by one in step 306, and proceeds to step 308 to determine whether the count value of counter COUNT_1 is within a count range defined by values $\alpha 1$ and $\alpha 2$, wherein $\alpha 1$ is equal to $$ta1 - \frac{ta1}{10},$$

$\alpha 2$ is equal to $$ta1 + \frac{ta1}{10},$$

and ta1 represents the number of sampling points in the interval ta1.

Since the count value of counter COUNT_1 has not been incremented up to this point, the count value of counter COUNT_1 is not within the range defined by $\alpha 1$ and $\alpha 2$, and step 312 is performed. In step 312, the value of edge counter EC is set to "0". Accordingly, the EC=0 point shown in FIG. 5A is established.

In step 314, central processing unit (CPU) 10 sets the value of counter COUNT_1 to "0". Then, in step 316, central processing unit (CPU) 10 determines whether the value of edge counter EC is four. Since the current value of edge counter EC is equal to "0", central processing unit (CPU) 10 returns to step 304 and determines the logic value corresponding to the next sampling point. Referring to FIG. 5A, the logic value received during this time is still "0". Accordingly, central processing unit (CPU) 10 repeatedly performs steps 306, 308, 312, 314 and 316 until a logic value of "1" is detected in step 304. That is, the value of counter COUNT_0 is continually increased for each sampling point until a logic value of "1" is detected.

When a logic value of "1" has been detected in step 304, central processing unit (CPU) 10 increases the value of counter COUNT_1 by one in step 318, and then performs step 320 to determine whether the value of counter COUNT_0 is within the range defined by values β1 and β2, wherein β1 is equal to $$ta2 - \frac{ta2}{10},$$

β2 is equal to $$ta2 + \frac{ta2}{10},$$

and ta2 represents the number of sampling points in the interval ta2.

In step 320, since the value of counter COUNT_0 has been previously incremented by the number of sampling points at step 306, the value of the counter COUNT_0 falls within the range defined by values β1 and β2. Accordingly, central processing unit (CPU) 10 increments the value of edge counter EC by one, to a value of "1", in step 322. When EC equals "1", this indicates a time point where the waveform of the busy tone changes from the off state to the on state, as shown in FIG. 5A.

In step 326, central processing unit (CPU) 10 resets the value of counter COUNT_0 to "0". Then, in step 316, central processing unit (CPU) 10 determines whether the value of edge counter EC is four. Since the current value of edge counter EC equals "1", central processing unit (CPU) 10 returns to step the 304 and determines the state of the logic value corresponding to the next sampling point. Referring to FIG. 5A, the logic value during this time is "1". Accordingly, central processing unit (CPU) 10 repeatedly performs steps 304, 318, 320, 324, 326 and 316 until a logic value of "0" indicating the next off state of the busy tone has been detected in step 304. That is, the value of counter COUNT_1 is continually increased for each sampling point until a logic value of "0" is again detected.

When the logic value of "0" is again detected in step 304, central processing unit (CPU) 10 increases the value of counter COUNT_0 by one in step 306, and proceeds to step 308 to determine whether the value of counter COUNT_1 is within the range defined by values α1 and α2. Since the value of counter COUNT_1 has been previously incremented by the number of sampling points in step 318, the value of counter COUNT_1 falls within α1 and α2. Therefore, central processing unit (CPU) 10 increases the value of edge counter EC by one in step 310. At this time, the value of edge counter equals two. In step 314, central processing unit (CPU) 10 resets the value of counter COUNT_1 to "0", and proceeds to step 316 to determine whether the value of edge counter EC is four. Since the current value of edge counter EC does not equal four, central processing unit (CPU) 10 returns to step 304.

As the busy tone periodically shifts between the on and off states, central processing unit (CPU) 10 repeatedly performs the routines shown in the left and right portions of FIG. 6 to continuously increase the value of edge counter EC. When the value of edge counter EC reaches four, central processing unit (CPU) 10 detects the received busy tone based on the tone pattern learning operation of FIG. 3.

The operation performed when the initial logic value is "1", as shown in FIG. 5B, is essentially the same as when the initial logic value is "0", as shown in FIG. 5A. The only difference is that central processing unit (CPU) 10 sets the value of edge counter EC to "0" in step 324 of FIG. 6, rather than step 312.

The second tone detection mode subroutine operation

An explanation of the operation of the second tone detection mode subroutine will now be given with reference to FIGS. 7A, 7B and 8.

Figure 7A:
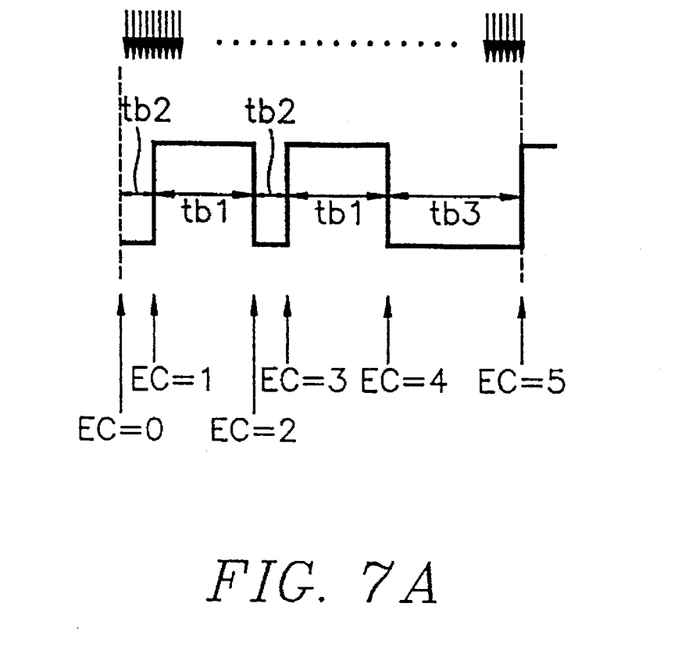
FIGS. 7A and 7B are waveforms illustrating the busy tone patterns detectable from the busy tone waveform of FIG. 2B.
Figure 7B:
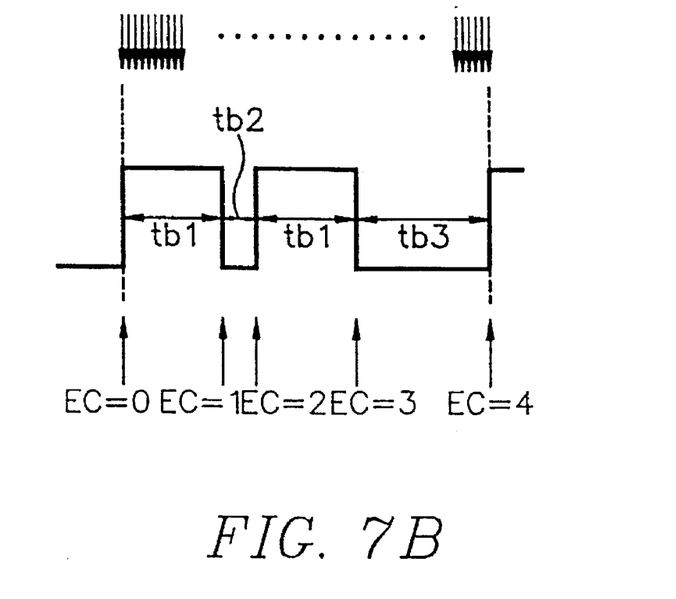

FIGS. 7A and 7B are waveforms illustrating the busy tone patterns detectable from the busy tone waveform of FIG. 2B. As noted from the waveform shown FIG. 2B, the time interval tb1 indicative of the on state, and time intervals tb2 and tb3 indicative of the off state all have different durations. FIG. 7A shows the case where the detected waveform of FIG. 2B is initially in the off state. On the other hand, FIG. 7B shows the case where the detected waveform of FIG. 2B is initially in the on state.

A brief description of the steps shown in FIG. 8 will be given before a detailed explanation of FIG. 8 is provided. Central processing unit (CPU) 10 determines that the busy tone input through signal level detector 26 is in the on state, or otherwise in the off state. When central processing unit (CPU) 10 initially determines that the busy tone is in the off state, a determination is made as to whether a value of the counter COUNT_1, for counting occurrences of the logic state indicating that the busy tone is in the on state, is within a first effective count range. That is, central processing unit (CPU) 10 determines whether α1<COUNT_1<α2. During this time, central processing unit (CPU) 10 increments the edge counter EC based on whether the counted value is within the first effective count range. On the other hand, if central processing unit (CPU) 10 initially determines that the busy tone is in the on state, a determination is made as to whether a value of the counter COUNT_0, for counting occurrences of the logic state indicating that the busy tone is in the off state, is within a second effective count range. That is, central processing unit (CPU) 10 determines whether β1<COUNT_0<β2. During this time, central processing unit (CPU) 10 increments the edge counter EC based on whether the counted value is within the second effective count range. Central processing unit (CPU) 10 repeatedly performs the above-described operations in accordance with the on and off states of the busy tone. When the value of the edge counter EC equals a value just less than a predetermined final count value, central processing unit (CPU) 10 determines whether a value of the counter COUNT_0 is within a third effective count range. That is, central processing unit (CPU) 10 determines whether γ1<COUNT_0<γ2. In this case, central processing unit (CPU) 10 detects the busy tone based on the tone pattern learning operation of FIG. 3.

A busy tone detecting operation based on the second tone detection mode will now be explained with reference to FIG. 8.

In step 400, central processing unit (CPU) 10 reads the logic state of the signal output from signal level detector 25 and samples the read logic value every 100 msecs. In step 402, central processing unit (CPU) 10 generates the sampled logic values of "0" or "1". In step 404, central processing unit (CPU) 10 determines whether a first logic value received in a sequential order is a "0" or "1". When the first logic value is "0" (i.e., as shown by the waveform of FIG. 7A), central processing unit (CPU) 10 increases the count value of the counter COUNT_0 by one in step 406. However, when the first logic value is "1" (i.e., as shown by the waveform of FIG. 7B), central processing unit (CPU) 10 increases the count value of counter COUNT_1 by one in step 418.

Assuming that the first received logic value is "0", as shown in FIG. 7A central processing unit (CPU) 10 increases the count value of counter COUNT_0 by one in step 406, and proceeds to step 408 to determine whether the count value of counter COUNT_1 is within the count range defined by values α1 and α2, wherein α1 is equal to $$tb1 - \frac{tb1}{10},$$

β2 is equal to $$tb1 + \frac{tb1}{10},$$

and tb1 represents the number of sampling points in the interval tb1.

Since the count value of the counter COUNT_1 has not been incremented up to this point, the count value of counter COUNT_1 is not within the range defined by value α1 and α2, and step 412 is performed. In step 412, the value of the edge counter EC is set to "0", as indicated in FIG. 7A.

In step 414, central processing unit (CPU) 10 sets the value of the counter COUNT_1 to "0". Central processing unit (CPU) 10 then returns to step 404 and determines the logic value corresponding to the next sampling point. Referring to FIG. 7A, the logic value received during this time is still "0". Accordingly, central processing unit (CPU) 10 repeatedly performs steps 406, 408, 412, 414 and 404 until a logic value of "1" is detected in step 404. That is, the value of counter COUNT_0 is continually increased for each sampling point until a logic value of "1" is detected by central processing unit (CPU) 10.

When a logic value of "1" has been detected in step 404, central processing unit (CPU) 10 increases the value of counter COUNT_1 by one in step 418, and then performs step 420 to determine whether the value of the edge counter EC is greater than or equal to three. When the value of the edge counter EC is greater than or equal to three, central processing unit (CPU) 10 performs step 428; and when the value of the edge counter EC is not greater than or equal to three, central processing unit (CPU) 10 performs step 422. Since the current value of edge counter EC is "0", central processing unit (CPU) 10 performs step 422.

In step 422, central processing unit (CPU) 10 determines whether the value of counter COUNT_0 is within the range defined by values β1 and β2, wherein β1 is equal to $$tb2 - \frac{tb2}{10},$$

β2 is equal to $$tb2 + \frac{tb2}{10},$$

and tb2 represents the number of sampling points in the interval tb2.

Since the value of counter COUNT_0 has been previously incremented by the number of sampling points in step 406, the value of counter COUNT_0 falls within β1 and β2. Therefore, central processing unit (CPU) 10 increases the value of edge counter EC by one in step 424. The point where EC=1 indicates a time point when the busy tone waveform shifts from the off state to the on state, as shown in FIG. 7A.

Central processing unit (CPU) 10 next proceeds to step 426 to reset the value of the counter COUNT_0 to "0". Central processing unit (CPU) 10 then returns to step the 404, and determines the logic value corresponding to the next sampling point. Referring to FIG. 7A, the logic value received during this time is still "1". Accordingly, central processing unit (CPU) 10 repeatedly performs steps 418, 420, 422, 430 and 426 until a logic value of "0" (i.e., the next off state corresponding to time interval tb2) is detected in step 404. That is, the value of counter COUNT_1 is continually increased for each sampling point until a logic value of "0" is detected.

If the logic value of "0" has been detected in step 404, central processing unit (CPU) 10 increases the value of counter COUNT_0 by one in step 406, and proceeds to step 408 to determine whether the value of counter COUNT_1 is within the range defined by values α1 and α2. Since the value of counter COUNT_1 has been previously incremented by the number of sampling points in step 418, the value of counter COUNT_1 falls within α1 and α2. Accordingly, central processing unit (CPU) 10 increases the value of edge counter EC by one in step 410. At this time, the value of edge counter EC equals two. In step 414, central processing unit (CPU) 10 resets the value of the counter COUNT_1 to "0", and returns to step 404.

As the busy tone periodically shifts between the on and off states, central processing unit (CPU) 10 repeatedly performs the routines shown in the left and right portions of FIG. 8 to continuously increase the value of the edge counter EC. When the first logic value detected by central processing unit (CPU) 10 in step 404 is "0", the value of edge counter EC is increased to even numbers two and four in step 410, and the value of edge counter EC is increased to odd numbers one, three and five in step 424. Hence, in this example, the value of edge counter EC is incremented to four in step 410. As shown in FIG. 7A, the point EC=4 indicates the beginning of the interval tb3.

After the value of edge counter EC has been incremented to four and a logic value of "1" is again applied to central processing unit (CPU) 10, central processing unit (CPU) 10 performs steps 418 and 420. In step 420, central processing unit (CPU) 10 determines whether the value of the edge counter EC is greater than or equal to three. Since the current value of edge counter EC is four, central processing unit (CPU) 10 performs step 428 by determining whether the value of counter COUNT_0 is within the range defined by values γ1 and γ2, wherein γ1 is equal to $$tb3 - \frac{tb3}{10},$$

γ2 is equal to $$tb3 + \frac{tb3}{10},$$

and tb3 represents the number of sampling points in the interval tb3.

Since the value of counter COUNT_0 has been previously incremented in step 406 after detecting the logic values of "0" during time interval tb3 of FIG. 7A, the value of counter COUNT_0 falls within γ1 and γ2. Accordingly, central processing unit (CPU) 10 proceeds to step 434 to detect the received busy tone based on the tone pattern learning operation of FIG. 3.

The operation performed when the initial logic value is "1", as shown in FIG. 7B, is essentially the same as when the initial logic value is "0", as shown in FIG. 7A. The only difference is that central processing unit (CPU) 10 sets the value of the edge counter EC to "0" in step 430 of FIG. 8. Also, the value of edge counter EC is set to two and four in step 424, and is set to one and three in step 410.

When the initial logic value is "1", as shown in FIG. 7B, an operation performed after the value of edge counter EC is incremented to three in step 410 will be described below. After the value of edge counter EC reaches three in step 410, the value of the counter COUNT_0 is incremented in step 406 in response to detecting logic values of "0" during the off state of time interval tb3. After time interval tb3 of FIG. 7B passes, since a logic value of "1" is then provided to central processing unit (CPU) 10, steps 418 and 420 are performed. In step 420, central processing unit (CPU) 10 determines whether the value of the edge counter EC is greater than or equal to three. Since the current value of edge counter EC is three, central processing unit (CPU) 10 proceeds to step 428 to determine whether the value of counter COUNT_0 is within the range defined by values γ1 and γ2, wherein γ1 is equal to $$tb3 - \frac{tb3}{10},$$

γ2 is equal to $$tb3 + \frac{tb3}{10},$$

and tb3 represents the number of sampling points in the interval tb3.

Since the value of counter COUNT_0 has been previously incremented in step 406 by detecting the logic value of "0" during the off state of time interval tb3, the value of counter COUNT_0 falls within γ1 and γ2. As a result, central processing unit (CPU) 10 proceeds to step 434 to detect the received busy tone based on the tone pattern learning operation of FIG. 3.

The third tone detection mode subroutine operation

Figure 9A:
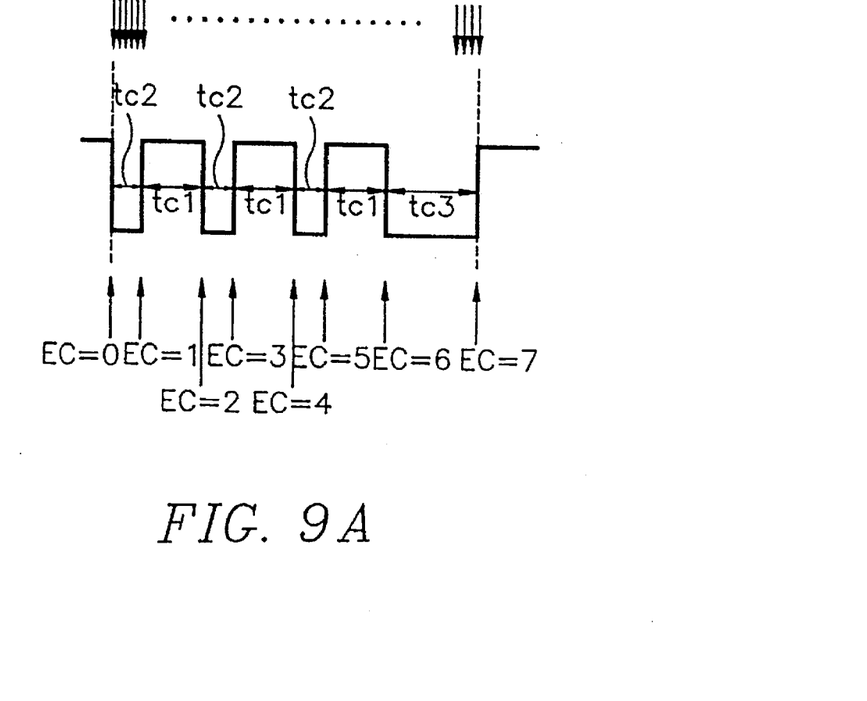
FIGS. 9A and 9B are waveforms illustrating the busy tone patterns detectable from the busy tone waveform of FIG. 2C.
Figure 9B:
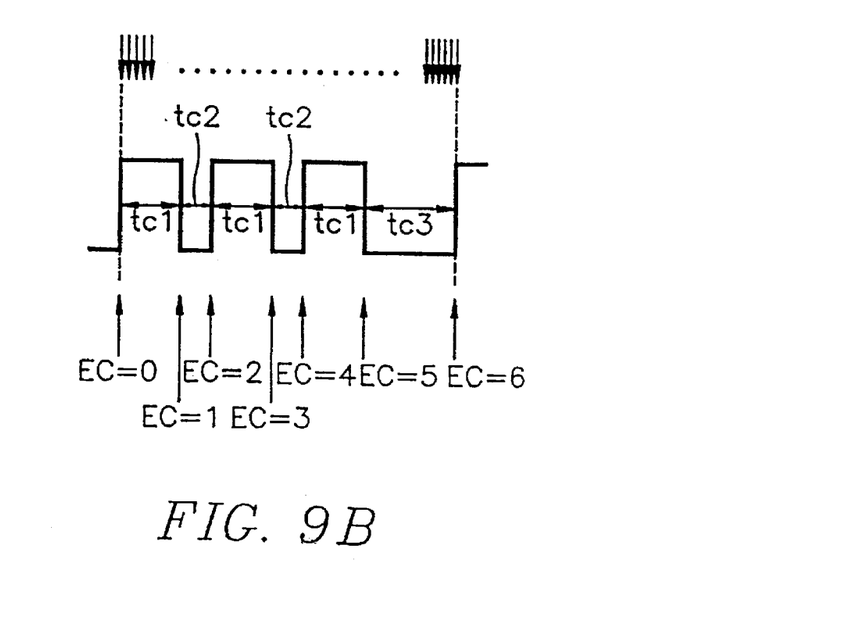

An explanation of the operation of the third tone detection mode subroutine will now be provided with reference to FIGS. 9A, 9B and 10.

FIGS. 9A and 9B are waveforms illustrating the busy tone patterns detectable from the busy tone waveform of FIG. 2C. As noted from the waveform shown in FIG. 2C, the time interval tc1 indicative of the on state, and time intervals tc2 and tc3 indicative of off states all have different durations. The busy tone waveform of FIG. 2C varies from the waveform of FIG. 2B in that the patterns of the busy tone are slightly different from each other. The busy tone pattern of FIG. 2B is sequentially comprised of on state time interval tb1, off state time interval tb2, on state time interval tb1 and off state time interval tb3. The busy tone pattern of FIG. 2C is sequentially comprised of: on state time interval tc1, off state time interval tc2, on state time interval tc1, off state time interval tc2, on state time interval tc1 and off state time interval tc3.

FIG. 9A shows the case where the detected waveform of FIG. 2C is initially in an off state. On the other hand, FIG. 9B shows the case where the detected waveform of FIG. 2C is initially in an on state.

A busy tone detecting operation of the third tone detection mode will now be explained with reference to FIG. 10.

The operation depicted in FIG. 10 is essentially the same as that of FIG. 8, except that the time intervals, the range of effective count values and the values of edge counter EC in FIG. 10 are different from those of FIG. 8. The time intervals tb1, tb2 and tb3 described in conjunction with FIG. 8 correspond to time intervals tc1, tc2 and tc3 of FIG. 10. Furthermore, each of the range count values α1 and α2, β1 and β2, and γ1 and γ2 as described in FIG. 8 correspond to each of the range values δ1 and δ2, ε1 and ε2, and ζ1 and ζ2 of FIG. 10. Hence, the range δ1 is equal to $$tc1 - \frac{tc1}{10},$$

δ2 is equal to $$tc1 + \frac{tc1}{10},$$

ε1 is equal to $$tc2 - \frac{tc2}{10},$$

, ε2 is equal to $$tc2 + \frac{tc2}{10},$$

ζ1 is equal to $$tc3 - \frac{tc3}{10},$$

and ζ2 is equal to $$tc3 + \frac{tc3}{10},$$

. The condition that the value of the edge counter EC is greater than or equal to three in step 420 of FIG. 8 corresponds to the condition that the value of the edge counter EC is greater than or equal to five in step 520 of FIG. 10.

A busy tone detecting operation based on the third tone detection mode will now be explained with reference to FIG. 10.

In step 500, central processing unit (CPU) 10 reads the logic state of the signal output from signal level detector 25 and samples the read logic value every 100 msecs. In step 502, central processing unit (CPU) 10 generates the sampled logic values of "0" or "1". In step 504, central processing unit (CPU) 10 determines whether a first logic value received in a sequential order is a "0" or "1". When the first logic value is "0" (i.e., as shown by the waveform of FIG. 9A), central processing unit (CPU) 10 increases the count value of the counter COUNT_0 by one in step 506. However, when the first logic value is "1" (i.e., as shown by the waveform of FIG. 9B), central processing unit (CPU) 10 increases the count value of counter COUNT_1 by one in step 518.

Assuming that the first received logic value is "0", as shown in FIG. 9A, central processing unit (CPU) 10 increases the count value of counter COUNT_0 by one in step 506, and proceeds to step 508 to determine whether the count value of counter COUNT_1 is within the count range defined by values δ1 and δ2, wherein δ1 is equal to $$tc1 - \frac{tc1}{10},$$

δ2 is equal to $$tc1 + \frac{tc1}{10},$$

and tc1 represents the number of sampling points in the interval tc1.

Since the count value of the counter COUNT_1 has not been incremented up to this point, the count value of counter COUNT_1 is not within the range defined by values δ1 and δ2, and step 512 is performed. In step 512, the value of the edge counter EC is set to "0", as indicated in FIG. 9A.

In step 514, central processing unit (CPU) 10 sets the value of the counter COUNT_1 to "0". Central processing unit (CPU) 10 then returns to step 504 and determines the logic value corresponding to the next sampling point. Referring to FIG. 9A the logic value received during this time is still "0". Accordingly, central processing unit (CPU) 10 repeatedly performs steps 506, 508, 512, 514 and 504 until a logic value of "1" is detected in step 504. That is, the value of counter COUNT_0 is continually increased for each sampling point until a logic value of "1" is detected by central processing unit (CPU) 10.

When a logic value of "1" has been detected in step 504, central processing unit (CPU) 10 increases the value of counter COUNT_1 by one in step 518, and then performs step 520 to determine whether the value of the edge counter EC is greater than or equal to five. When the value of the edge counter EC is greater than or equal to five, central processing unit (CPU) 10 performs step 528; and when the value of the edge counter EC is not greater than or equal to five, central processing unit (CPU) 10 performs step 522. Since the current value of edge counter EC is "0", central processing unit (CPU) 10 performs step 522.

In step 522, central processing unit (CPU) 10 determines whether the value of counter COUNT_0 is within the range defined by values ε1 and ε2, wherein ε1 is equal to $$tc2 - \frac{tc2}{10},$$

ε2 is equal to $$tc2 + \frac{tc2}{10},$$

and tc2 represents the number of sampling points in the interval tc2.

Since the value of counter COUNT_0 has been previously incremented by the number of sampling points in step 506, the value of counter COUNT_0 falls within ε1 and ε2. Therefore, central processing unit (CPU) 10 increases the value of edge counter EC by one in step 524. The point where EC=1 indicates a time point when the busy tone waveform shifts from the off state to the on state, as shown in FIG. 9A.

Central processing unit (CPU) 10 next proceeds to step 526 to reset the value of the counter COUNT_0 to "0". Central processing unit (CPU) 10 then returns to step the 504, and determines the logic value corresponding to the next sampling point. Referring to FIG. 9A the logic value received during this time is still "1". Accordingly, central processing unit (CPU) 10 repeatedly performs steps 518, 520, 522, 530 and 526 until a logic value of "0" (i.e., the next off state corresponding to time interval tb2) is detected in step 504. That is, the value of counter COUNT_1 is continually increased for each sampling point until a logic value of "0" is detected. Once the logic value of "0" is detected in step 504, the edge counter EC is incremented by one in step 510. The steps of FIG. 10 are repeatedly performed as described in FIG. 8, with the exception of those differences discussed above, until the busy tone is detected in step 534. Accordingly, further description of the operation of FIG. 10 will be omitted for the sake of brevity.

According to the principles of the present invention, central processing unit (CPU) 10 can detect the busy tone within at least two or three periods of the busy tone by performing one of the first, second or third tone detection mode subroutines. By rapidly detecting the busy tone, central processing unit (CPU) 10 can stop the message recording operation in step 206 of FIG. 4 without recording unnecessary matter (e.g., silence or busy tone) on the recording medium.

The present invention has been described above with reference to an automatic telephone answering system. However, the principles of the present invention can also be embodied in any type of device which utilizes an automatic answering function. For example, the present invention can be embodied in a facsimile system having the automatic answering function.

As earlier described, an automatic telephone answering system constructed according to the principles of the present invention performs a tone pattern learning operation upon being supplied with power, performs a detecting mode program corresponding to the busy tone pattern identified in the learning operation, and detects a received busy tone in a rapid and accurate manner.

What is claimed is:

1. A method for recognizing a predetermined busy tone pattern in an automatic answering system, comprising the steps of:

detecting a signal received through a signal path, said signal exhibiting first and second states;

sampling said signal according to a predetermined sampling period to generate first and second logic values corresponding to said first and second states, respectively;

executing counting operations to produce first and second count values in response to generation of said first and second logic values, respectively;

determining whether said first count value is within a first count range when said signal shifts from said first state to said second state;

determining whether said second count value is within a second count range when said signal shifts from second state to said first state;

incrementing an edge counter when said first count value is within said first count range, and when said second count value is within said second count range; and recognizing said predetermined busy tone pattern from said signal after said edge counter exhibits a predetermined value.

2. The method as claimed in claim 1, wherein said first count range is defined based on a first number of sampling points within a first interval during which said signal exhibits said first state, and said second range is defined based on a second number of sampling points within a second interval during which said signal exhibits said second state.

3. The method as claimed in claim 2, further comprised of said first count range extending from a first value that is ten percent less than said first number of sampling points within said first interval to a second value that is ten percent greater than said first number of sampling points within said first interval.

4. The method as claimed in claim 3, further comprised of said second count range extending from a third value that is ten percent less than said second number of sampling points within said second interval to a fourth value that is ten percent greater than said second number of sampling points within said second interval.

5. The method as claimed in claim 4, wherein said predetermined value exhibited by said edge counter equals four.

6. The method as claimed in claim 5, wherein said first number of sampling points within said first count range is equal to said second number of sampling points within said second count range.

7. The method as claimed in claim 4, further comprising a step of determining whether said second count value is within a third count range after said edge counter exhibits said predetermined value.

8. The method as claimed in claim 7, wherein said third count range is defined based on a third number of sampling points within a third interval during which said signal exhibits said second state.

9. The method as claimed in claim 8, further comprised of said third count range extending from a fifth value that is ten percent less than said third number of sampling points within said third interval to a sixth value that is ten percent greater than said third number of sampling points within said third interval.

10. The method as claimed in claim 9, wherein said predetermined value exhibited by said edge counter equals three.

11. The method as claimed in claim 9, wherein said predetermined value exhibited by said edge counter equals five.

12. A method for recognizing a pattern of a busy tone and performing a recording operation in an automatic answering system, said method comprising the steps of: forming a signal path between said system and an exchange in response to said system receiving operating power;

receiving said busy tone from said exchange during a predetermined time period;

sampling said busy tone according to a predetermined sampling period to generate logic values representative of said pattern of said busy tone;

storing said logic values in memory and disconnecting said signal path;

analyzing said logic values stored in said memory to identify said pattern of said busy tone;

receiving an incoming call from a calling party through said signal path, and performing said recording operation comprised of recording a message provided from said calling party;

detecting a signal received through said signal path while performing said recording operation, said signal exhibiting first and second states;

sampling said signal according to said predetermined sampling period to generate first and second binary values corresponding to said first and second states, respectively;

executing counting operations to produce first and second count values in response to generation of said first and second binary values, respectively;

determining whether said first count value is within a first count range when said signal shifts from said first state to said second state;

determining whether said second count value is within a second count range when said signal shifts from said second state to said first state;

incrementing an edge counter when said first count value is within said first count range, and when said second count value is within said second count range;

recognizing said pattern of said busy tone from said signal after said edge counter exhibits a predetermined value; and stopping said recording operation in response to recognizing said pattern of said busy tone.

13. The method as claimed in claim 12, wherein said predetermined sampling period is 100 milliseconds.

14. The method as claimed in claim 12, wherein said first count range is defined based on a first number of sampling points within a first interval during which said signal exhibits said first state, and said second range is defined based on a second number of sampling points within a second interval during which said signal exhibits said second state.

15. The method as claimed in claim 14, further comprised of said first count range extending from a first value that is ten percent less than said first number of sampling points within said first interval to a second value that is ten percent greater than said first number of sampling points within said first interval.

16. The method as claimed in claim 15, further comprised of said second count range extending from a third value that is ten percent less than said second number of sampling points within said second interval to a fourth value that is ten percent greater than said second number of sampling points within said second interval.

17. The method as claimed in claim 16, wherein said predetermined value exhibited by said edge counter equals four.

18. The method as claimed in claim 17, wherein said first number of sampling points within said first count range is equal to said second number of sampling points within said second count range.

19. The method as claimed in claim 16, further comprising a step of determining whether said second count value is within a third count range after said edge counter exhibits said predetermined value.

20. The method as claimed in claim 19, wherein said third count range is defined based on a third number of sampling points within a third interval during which said signal exhibits said second state.

21. The method as claimed in claim 20, further comprised of said third count range extending from a fifth value that is ten percent less than said third number of sampling points within said third interval to a sixth value that is ten percent greater than said third number of sampling points within said third interval.

22. The method as claimed in claim 21, wherein said predetermined value exhibited by said edge counter equals three.

23. The method as claimed in claim 21, wherein said predetermined value exhibited by said edge counter equals five.

24. A method for recognizing a busy tone pattern in an automatic answering system, comprising the steps of:

detecting first and second states of a signal received through a signal path;

sampling said signal according to a predetermined sampling period to generate first and second logic values corresponding to said first and second states, respectively;

determining whether a first count value representative of a number of times said first logic value has been generated is within a first count range;

adjusting a value of an edge counter when said first count value is within said first count range;

determining whether a second count value representative of a number of times said second logic value has been generated is within a second count range;

adjusting said value of said edge counter when said second count value is within said second count range;

determining whether said value of said edge counter is equal to a predetermined count value; and recognizing said busy tone pattern from said signal when said value of said edge counter is equal to said predetermined count value.

25. The method as claimed in claim 24, wherein said first count range is equal to said second count range.

26. The method as claimed in claim 25, further comprised of said first count range extending from a first value that is ten percent less than a number of sampling points within an interval during which said signal exhibits said first state to a second value that is ten percent greater than said number of sampling points within said interval.

27. The method as claimed in claim 25, further comprised of said second count range extending from a first value that is ten percent less than a number of sampling points within an interval during which said signal exhibits said second state to a second value that is ten percent greater than said number of sampling points within said said interval.

28. The method as claimed in claim 24, wherein said predetermined count value equals four.

29. A method for recognizing a busy tone pattern in an automatic answering system, comprising the steps of:

detecting first and second states of a signal received through a signal path;

sampling said signal according to a predetermined sampling period to generate first and second logic values corresponding to said first and second states, respectively;

determining whether a first count value representative of a number of times said first logic value has been generated is within a first count range;

adjusting a value of an edge counter when said first count value is within said first count range;

determining whether a second count value representative of a number of times said second logic value has been generated is within a second count range;

adjusting said value of said edge counter when said second count value is within said second count range;

determining whether said value of said edge counter is greater than or equal to a predetermined count value;

determining whether said second count value is within a third count range when said value of said edge counter is greater than or equal to said predetermined count value; and recognizing said busy tone pattern from said signal when said second count value is within said third count range.

30. The method as claimed in claim 29, further comprised of said first count range extending from a first value that is ten percent less than a number of sampling points within a first interval during which said signal exhibits said first state to a second value that is ten percent greater than said number of sampling points within said first interval.

31. The method as claimed in claim 30, further comprised of said second count range extending from a third value that is ten percent less than a number of sampling points within a second interval during which said signal exhibits said second state to a fourth value that is ten percent greater than said number of sampling points within said second interval.

32. The method as claimed in claim 31, further comprised of said third count range extending from a fifth value that is ten percent less than a number of sampling points within a third interval when said signal exhibits said second state to a sixth value that is ten percent greater than said number of sampling points within said third interval.

33. The method as claimed in claim 32, wherein said predetermined count value equals three.

34. The method as claimed in claim 32, wherein said predetermined count value equals five.

35. A method for learning a pattern of a busy tone indicative of termination of communication in an automatic answering system, said method comprising the steps of connecting a signal path between said system and an exchange in response to providing operating power to said system;

refraining from performing a tone detection operation during a first time interval in order to skip a dial tone provided from said exchange through said signal path;

performing said tone detection operation during a second time interval after said first time interval has passed to detect said busy tone provided from said exchange through said signal path;

sampling said busy tone according to a predetermined sampling period during said second time interval to generate logic values corresponding to said busy tone;

storing said logic values in a memory and disconnecting said signal path; and analyzing said logic values stored in said memory according to said predetermined sampling period to learn said pattern of said busy tone.

36. The method as claimed in claim 35, wherein said first time interval is approximately 15 seconds.

37. The method as claimed in claim 36, wherein said second time interval is approximately 20 seconds.

* * * * *